June 18, 1929.        R. H. BAUR        1,717,544
VEHICLE LAMP SIGNAL
Filed Sept. 10, 1924        2 Sheets-Sheet 1
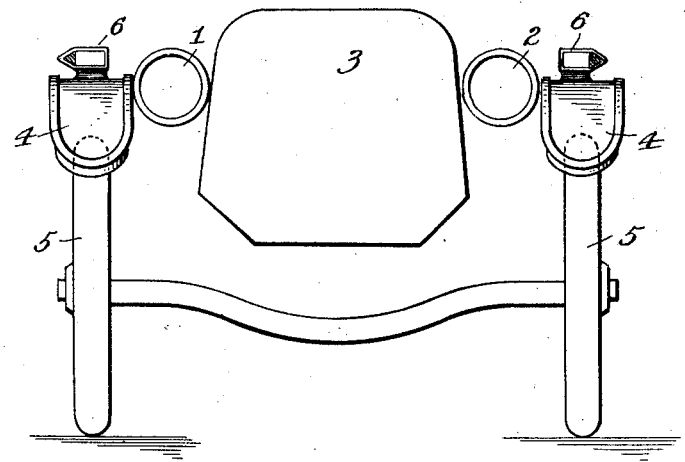
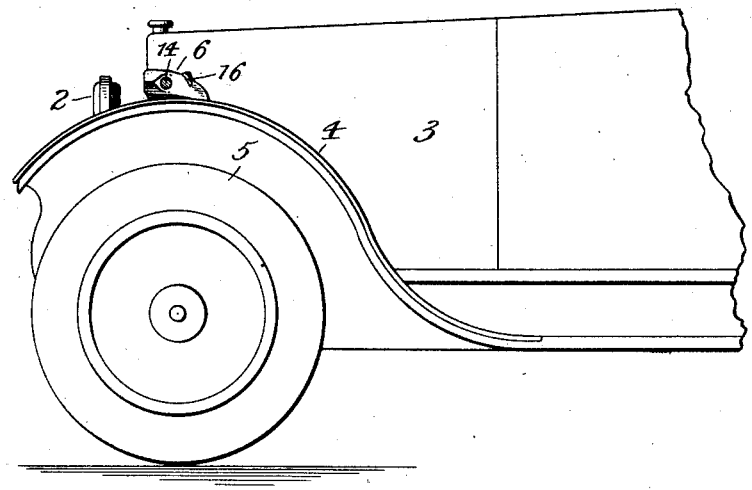

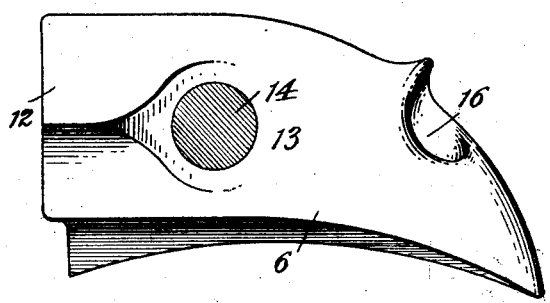
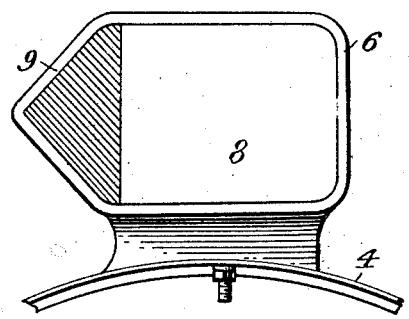
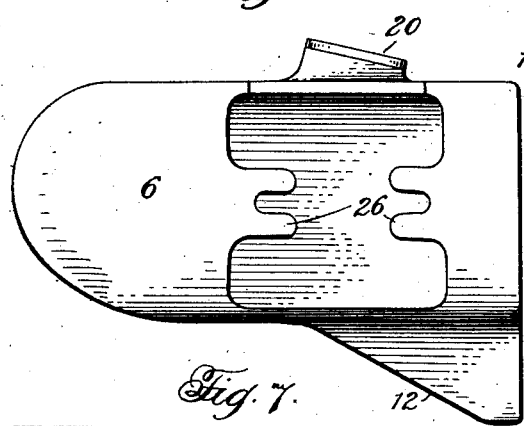
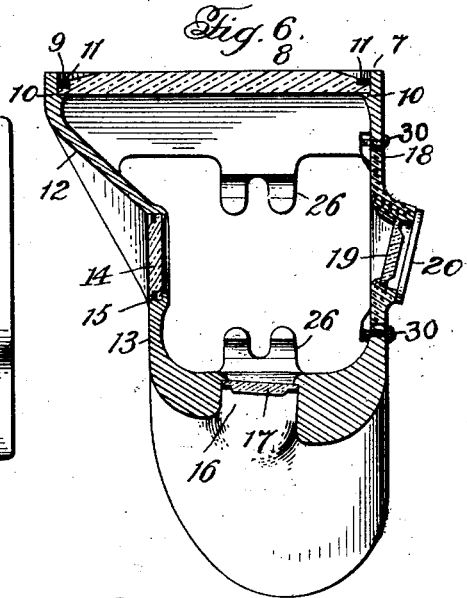
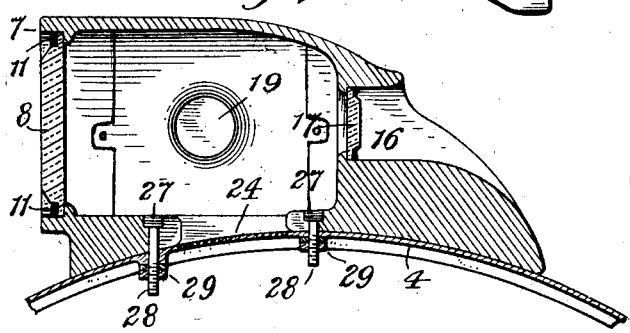
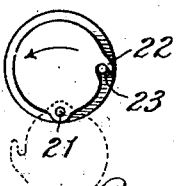

Patented June 18, 1929.

1,717,544

UNITED STATES PATENT OFFICE.

RAYMOND H. BAUR, OF KENILWORTH, DISTRICT OF COLUMBIA.

VEHICLE LAMP SIGNAL.

Application filed September 10, 1924. Serial No. 736,998.

This invention relates to certain new and useful improvements in automobile signal lights and I declare the following description, when read in connection with the attached drawings to clearly and concisely set forth the structure embodied in my present improvement.

Before entering into the present invention, it might be well to lay clear some of the disadvantages or perilous positions to which the present day motorists are subjected. All traffic regulations, as far as is known, require head lights or running lights to be properly displayed on all vehicles after sunset and it is in reference to these lights that the present invention primarily relates. It has become a common sight to be traveling along a roadway after dark when head lights are supposed to be light to see another vehicle approaching with a single light. It is an impossible matter to distinguish whether the approaching vehicle is an automobile or a motor-cycle, and it is extremely dangerous to the occupants of both vehicles in case the same is an automobile, especially if either of them are traveling at a high rate of speed. For instance, if the left hand or the right hand head lights of the approaching automobile is not illuminated, the general impression is that the vehicle is a motor-cycle and the operator of the other car is not so cautious as to the road space required for the passage of the approaching automobile.

Now in order to obviate this difficulty, the present invention has been devised and it resides in the provision of a lamp so positioned on some forward portion of the vehicle, one on the right and the other on the left hand side of the vehicle. When displayed in their appropriate position, these signal lamps, by their peculiar construction will definitely inform an operator of an automobile if any of the head lights on the approaching vehicle are not functioning.

It is therefore the primary object of the present invention to provide a signal lamp which will clearly and definitely warn the operator of a vehicle approaching in the opposite direction to allow sufficient space for the passage of the vehicle.

Another object of the present invention is the dual mounting of the lamps to constitute parking signals. By having one on either side of the machine, either right or left hand parking is made possible with the proper rear light signal displayed in either case.

A still further object of the invention resides in the provision of a manually-operated shutter, which when moved to an open position permits a beam of light to be thrown on the engine or mechanism within the hood to enable ready inspection or repair of said parts when desired.

These and further objects will be readily apparent to those skilled in this particular art when the following description is read in connection with the attached drawings and it is to be understood that the disclosure that is made therein is merely illustrative of the preferred embodiment of the invention. Certain changes might be made without departing from the spirit of the invention and the scope of protection will be readily apparent from the appended claims.

In the drawings, wherein similar reference characters indicate like parts throughout the several views, Fig. 1 is a diagrammatic front view of an automobile showing the relation between the signal lamps and the usual head lights on the automobile;

Fig. 2 is a side view of a forward portion of an automobile showing the signal lamps mounted on the fenders and approximately in alinement with the forward end of the engine casing;

Fig. 3 is a side elevation of one of the signal lamps;

Fig. 4 is a front elevation of my improved lamp;

Fig. 5 is a view looking from the bottom of the structure and illustrating more concisely the manner of fastening the lamp in its position on the automobile;

Fig. 6 is a horizontal sectional view;

Fig. 7 is a vertical sectional view; and

Fig. 8 is a detailed view dealing with the shutter used in connection with the lens disposed towards the engine side of the vehicle.

Referring more in detail to the drawings, 1 indicates the right hand and 2 the left hand head lights of the vehicle, 3 the usual engine casing or housing and 4—4 the mud guards or fenders over the forward wheels 5—5. On each of the fenders 4 is mounted a lamp generally indicated at 6—6 in Fig. 1. The lamp casings are made of a hollow casting with its forward end open as at 7 for the reception of a lens 8. One side of the opening 7 has a tapering formation as suggested at 9, the right hand lamp casing will have this formation towards the right side while the left hand lamp casing will have the tapering formation directed towards the left. The lens 8 will be made to fit this opening in each of the lamp casings and the formation of the lens that fits within the taper will be made or provided with a contrasting color. I prefer to have the main body portion of the lens 8 of clear glass and the tapered portion thereof colored in green or red, but any other combination of color scheme may be employed with the same result. When the lens 8 is inserted within the open end of the lamp casing it rests against spaced stops 10—10 and is held thereagainst by an exteriorly arranged bead or retaining member 11—11.

Referring particularly to Fig. 6, it will be seen that the outside wall of the lamp casing tapers inwardly and rearward as designated at 12 from the elongated forward portion to the straight side walled portion 13. Within the side wall 13 is positioned a colored lens 14, which is held to its seat by a retaining member illustrated at 15. This lens 14 constitutes a signal means which may be readily seen when approaching from either side of the vehicle. In positioning the lens 14 as shown, it will be noticed that the tapering portion of the casing shields and prevents rays issuing from the lens 14 from being seen by the operator of an approaching vehicle until the cars are almost abreast. The rear end of the lamp casing is a general tapering formation with the top and side walls symmetrically curving one into the other as suggested in Figs. 3, 6 and 7. Within this curved butt of the casing, which, as will be noted, is relatively thick, there is an opening designated 16, this opening being rearwardly and outwardly directed with respect to the longitudinal axis of the body of the lamp casing. Within the base of the opening 16 there is positioned a lens 17 which is red in color to constitute a tail light signal for the structure. The outward inclination given to the opening 16 is for the purpose of preventing any glare from the lens 17 from interfering with the vision of the operator of the vehicle. On the inside wall 18 of the lamp I provide an angularly positioned lens 19 which lens is preferably of clear glass and covering the same is a shutter 20. The shutter 20 is pivoted at 21 as shown in Fig. 8 and further is provided with a lip 22 for coaction with a stop pin 23 for holding the pivoted shutter in its desired closed position. The inclination that is given to the lens 19 is sufficient to direct a beam of light onto the engine within the housing when the side covers of said housing are raised for the purpose of inspection or repairs.

The base of the lamp casing is curved both longitudinally and transversely to snugly fit upon the surface of the vehicle fender and to properly hold the structure in its appropriate position, the following provision is made:—Within the base of the lamp there is an opening designated 24 which is for the purpose of receiving the lamp bulb or any desired illuminating medium. The walls of the opening are also inwardly extended as suggested at 25—25 to constitute bifurcated ears. These ears are transversely grooved as suggested at 26—26 to appropriately receive the cross-head 27 on the fastening or bolts 28. The lower ends of the bolts 28 are threaded to receive the nuts 29—29.

The inner wall 18 is preferably made removable, being held in its secured position by the bolts 30—30, as shown in Fig. 6. This permits ready access to the lamp bulb within the casing in case of repairs or replacement.

What I claim is:

1. In combination with the headlights of a vehicle, an auxiliary running lamp mounted to the side of each headlight and at the forward portion of the vehicle, said lamp having an opening in its forward end converging toward one side thereof, a lens having a correspondingly converging area and fitted within the opening of the lamp, the converging area of the lens being colored and directed to one side to indicate the particular side of the vehicle upon which the lamp is mounted.

2. In an auxiliary running lamp casing for vehicles adapted for mounting on the side and adjacent the forward portion of the vehicle, forward and rear lens seats formed within the casing, lenses secured to the respective seats, said rear lens seat arranged within a relatively deep opening, the longitudinal axis of said opening being outwardly and rearwardly inclined thereby shielding the vision of the operator from the direct rays of the rear lens.

3. An auxiliary running lamp casing provided within its rear wall with a relatively deep opening extending obliquely and laterally to the axis of the lamp, and a lens positioned within and adjacent the inner end of the opening.

4. In combination with the headlights of a vehicle, running lights used in connection therewith and mounted on the side fenders of the vehicle, each of said running lights having a lens in the forward face thereof, each of said lens having a relatively large clear section adjacent the inner side, and a distinctively marked tapering end portion directed toward the outer side to indicate the particular side of the vehicle upon which said light is mounted.

5. In combination with the front side fenders of a vehicle, and an auxiliary running lamp adapted for mounting on each of said fenders, the forward face of the lamp having an elongated opening therein and a lens seated within the opening and having a substantially rectangular clear section and a contrastingly marked tapering section, the tapering section of each lamp being directed toward their respective outer sides to indicate the particular side of the vehicle upon which said lamp is mounted.

In testimony whereof I hereunto affix my signature.

RAYMOND H. BAUR.